2,796,605
ARTIFICIAL FISH BAIT

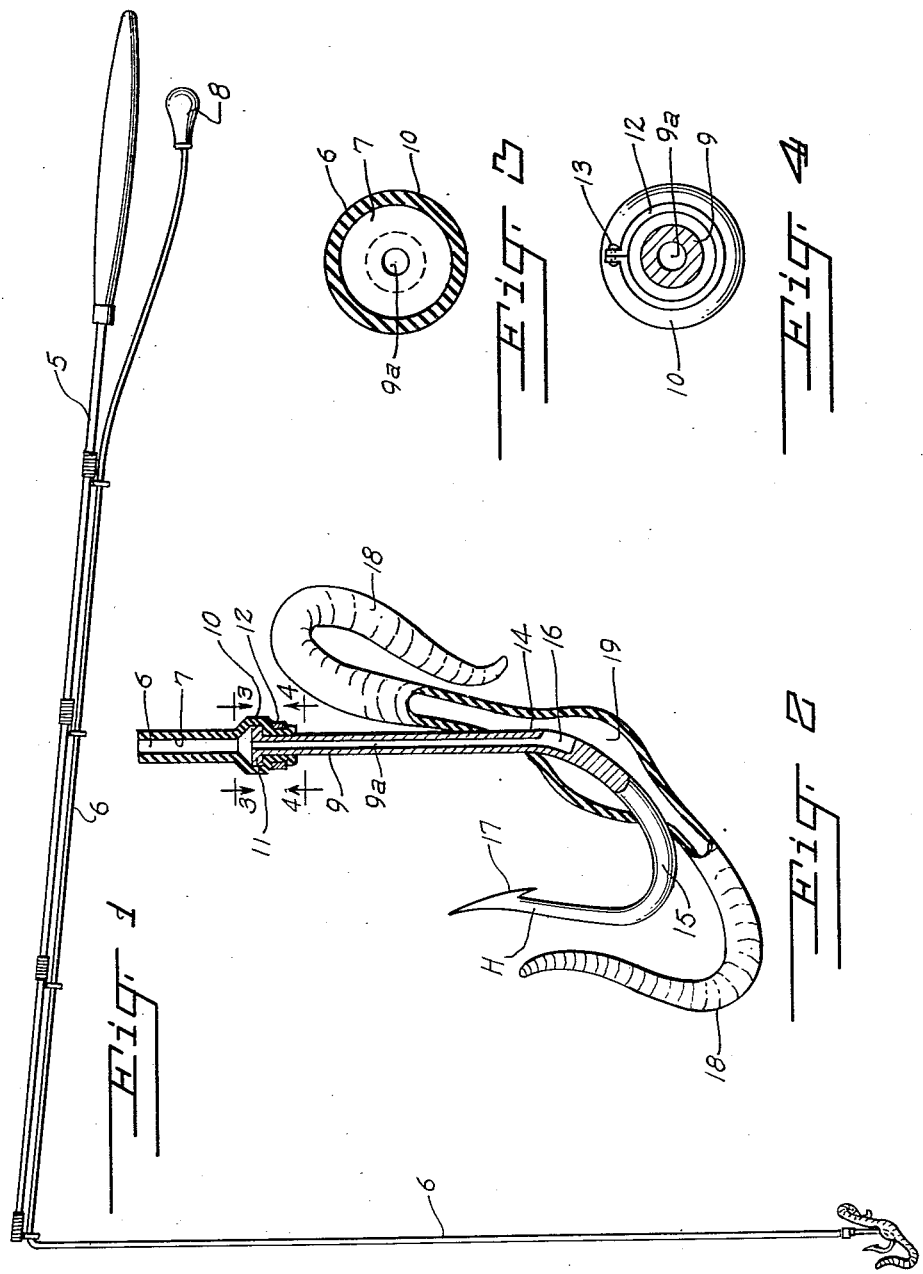
INVENTOR.
Irie R. Ashley

Irie R. Ashley, Lumberton, N. C.

Application March 4, 1955, Serial No. 492,265

5 Claims. (Cl. 43—26.2)

This invention relates in general to artificial fish bait and has more particular reference to an artificial bait that simulates a live bait.

One object of this invention is to provide an air inflatable artificial bait which can readily be inflated and deflated at will, thus to simulate in all respects a live bait.

Further objects, purposes and characteristic features of this invention will appear as the description progresses, reference being made to the accompanying drawings. In these drawings is shown one specific form of the invention solely for the purpose of illustration and in no sense whatsoever in a limiting manner.

In the drawings:

Figure 1 is a schematic view of one specific form which the invention can assume;

Figure 2 is a fragmentary cross sectional view of a hook and artificial bait in accordance with this invention;

Figure 3 is a cross sectional view on line 3—3 of Figure 2, and viewed in the direction of the arrows; and Figure 4 is a cross sectional view on line 4—4 of Figure 2, and viewed in the direction of the arrows.

Referring now to the drawings, there is here shown a usual fishing rod 5, carrying a fishing line 6, of novel form. Line 6 is a slender, strong, hollow tubular member as shown hollow at 7, and has a hollow air bulb 8, connected to its outer end, whereby at will to force air under pressure through hollow line 6.

At the lower end of the line is a novel hook H, connected at its shank end 9, to line 6, by a detachable coupling including a female member 10, on the line, a male member 11 on the hook shank, and a holding strap 12 with a tightening member 13; all as clearly illustrated in Figures 2 and 4.

Hook H, in accordance with this invention is of novel form. The shank 9 of the hook is hollow and tubular as at 9a from its end to a point 14, at the start of the usual hook bend 15, where a lateral opening 16, connects the channel or bore 9a to the outside. The hook has a usual barb 17.

On the hook is shown an artificial bait 18, in the form of an earth worm. The bait is hollow as at 19 and is positioned on the hook so that the cavity 19 in the bait is in communication with opening 16 in the hook. This bait is formed of elastic material, so that it can be inflated and deflated at will, by means of air bulb 8 to thus simulate a live bait.

It is to be understood that the worm bait is shown merely as one form of bait, and in accordance with this invention any suitable other forms can be used as, for example, crickets, grasshoppers, etc.

The above rather specific description of one form of this invention has been given by way of example and is not to be construed, in any manner, in a limiting sense.

What is claimed is:

1. In fishing apparatus, a hollow fish line having a tubular channel throughout its length, a bent fish hook connected to an end of the fish line, said hook having a tubular channel connecting, at one end with the tubular channel in the line, and at its other end passing through the surface of the hook at a point just above the bend, and a hollow, resilient, artificial bait, in a form to simulate a live organism, so pierced by the hook as to communicate the hook channel with the hollow interior of the bait.

2. In fishing apparatus, a hollow fish line having a tubular channel throughout its length, a bent fish hook connected to an end of the fish line, said hook having a tubular channel connecting, at one end with the tubular channel in the line, and at its other end passing through the surface of the hook at a point just above the bend, and an air bulb connected to said hollow fish line, for forcing air under pressure, through the channel in the hook.

3. In fishing apparatus, a hollow fish line having a tubular channel throughout its length, a bent fish hook connected to an end of the fish line, said hook having a tubular channel connecting, at one end with the tubular channel in the line, and at its other end passing through the surface of the hook at a point just above the bend, and a hollow, resilient, artificial bait, in a form to simulate a live organism, so pierced by the hook as to communicate the hook channel with the hollow interior of the bait, and an air bulb connected to said hollow fish line, for forcing air under pressure, through the channel in the hook.

4. A fishing apparatus comprising a tubular fish line, a fish hook having a shank carried by said line, said shank having a bore extending longitudinally thereof with one end in communication with said line, and a hollow inflatable artificial bait carried on said hook with the hollow interior thereof being in communication with the other end of said bore.

5. A fishing apparatus comprising a tubular fish line, a fish hook having a shank carried by said line, said shank having a bore extending longitudinally thereof with one end in communication with said line, and a hollow inflatable artificial bait carried on said hook with the hollow interior thereof being in communication with the other end of said bore, and means carried by said line remote from said hook and in communication therewith for providing pressure fluid in said line to flow through said bore and into said lure for controlling the inflation and deflation of the lure.

References Cited in the file of this patent

UNITED STATES PATENTS

| | | |
|---|---|---|
| 427,730 | Bond | May 13, 1890 |
| 536,512 | Crossley et al. | Mar. 26, 1895 |
| 1,842,490 | Pysher | Jan. 26, 1932 |
| 1,893,000 | Ranney | Jan. 3, 1933 |
| 2,594,387 | Breuer | Apr. 29, 1952 |